United States Patent [19]

Koyama et al.

[11] Patent Number: 4,958,339
[45] Date of Patent: Sep. 18, 1990

[54] OPTICAL CARD WITH INCREASED DATA STORAGE CAPACITY AND RECORDING/REPRODUCING APPARATUS THEREFOR

[75] Inventors: Ikuo Koyama, Tokyo; Hajime Ohata, Yamato, both of Japan

[73] Assignee: Kabushiki Kaisha Toshiba, Kawasaki, Japan

[21] Appl. No.: 293,048

[22] Filed: Jan. 3, 1989

[30] Foreign Application Priority Data

Jan. 7, 1988 [JP]  Japan .................................. 63-738
Jan. 13, 1988 [JP]  Japan .................................. 63-5120

[51]  Int. Cl.⁵ .......................... G11B 3/74; G11B 7/20
[52]  U.S. Cl. ...................................... 369/98; 235/454; 235/481; 235/488
[58]  Field of Search ..................... 235/454, 487, 488; 369/98

[56] References Cited

U.S. PATENT DOCUMENTS 4,500,777  2/1985  Drexler .

FOREIGN PATENT DOCUMENTS

WO88/06339  8/1988  Japan .
2092791A    8/1982  United Kingdom .
2092791     8/1982  United Kingdom .

Primary Examiner—Harold I. Pitts
Attorney, Agent, or Firm—Finnegan, Henderson, Farabow, Garrett and Dunner

[57] ABSTRACT

An optical card for storing data includes a base member and a plurality of parallel linear tracks on the base member for storing the data. Address data is recorded alternately on an opposite end of each successive track for storing an identifying code corresponding to the respective track.

12 Claims, 8 Drawing Sheets

OPTICAL CARD WITH INCREASED DATA STORAGE CAPACITY AND RECORDING/REPRODUCING APPARATUS THEREFOR

BACKGROUND OF THE INVENTION

1. Field of the Invention

The present invention relates to a data recording medium and, more particularly, to an optical card having track identifying data disposed alternately on tracks and a recording/reproducing apparatus therefor.

2. Description of the Related Art

An optical card is a kind of data recording medium. The optical card is generally rectangular in shape and has a data recording area on its major surface. On the data recording area a plurality of guide lines are formed parallel to one another in the direction of the long side of the card. A portion between adjacent guide lines is called a track on which data to be later reproduced is recorded. Further, track-identifying address data is recorded at one end of each track prior to recording data for later reproduction. To record or reproduce data, address data is read first so as to determine whether the corresponding track is a read/write track for recording or reproducing.

The recording/reproducing apparatus adapted to record data on or reproduce data from the optical card comprises an optical system for directing a laser beam, adapted for recording or reproducing data, onto the data recording area of the card, and a carrying system for carrying the card. The optical system is moved by a predetermined distance in the direction of the short side width of the card in order for a laser-beam spot to gain access to a destination track. After the access to the destination track, the carrying system is moved by a predetermined distance in the direction of the long side of the card in order for the spot to gain access to a destination location on the destination track. During recording or reproducing, particularly, the carrying system is frequently moved back and forth. Usually, the length of an acceleration section in which the carrying system is accelerated and the length of a deceleration section in which the carrying system is decelerated during the reciprocating motion of the carrying system are equal to each other.

With such a card as described above, address data is recorded at one end (for example, the left-hand end) of each track. Therefore, in order to record on or reproduce from the next track after the completion of recording or reproduction for one track (at this time the laser-beam spot locates at the other end, or the right-hand end of the one track), the carrying system will have to be moved so that the spot may return to the left-hand end of the next track to read address data. Thus, additional time is required to return the spot from the right-hand end of one track to the left-hand end of the next track.

To save time, there is another type of card in which address data is recorded at both ends of each track. In the case of this type of card, however, it is apparent that the data recording area is reduced because address data is recorded not only at one end of each track but also at the other end thereof.

Further, the idea that the acceleration section and the deceleration section of the card carrying system should be equal in length to each other has commonly been accepted. Therefore, the reduction of these sections, which do not contribute to the recording and reproducing of data in practice, has not been seriously considered up to now.

SUMMARY OF THE INVENTION

It is accordingly an object of the present invention to increase the speed of reading/writing of data on an optical card.

It is another object of the present invention to provide a recording/reproducing apparatus which enables the speed of data recording/reproducing on an optical card to be increased without substantially reducing the storage capacity.

According to the present invention, there is provided an optical card for storing data comprising: a base member; a plurality of parallel linear tracks on the base member for storing the data; and address means alternately on an opposite end of each successive track for storing an identifying code corresponding to the respective track.

Further, according to the present invention, there is also provided a data recording/reproducing apparatus for an optical card having a plurality of recording tracks provided in a predetermined direction, comprising: carrying means for carrying the card; recording/reproducing means for recording data on or reproducing data from the card carried by the carrying means; first means for moving the recording/reproducing means relative to the card in a direction normal to the predetermined direction for aligning the recording/reproducing means with one of the plurality of recording tracks; second means for moving the carrying means in the predetermined direction from a stop condition wherein the carrying means is stopped to a uniform velocity condition wherein data is recorded on or reproduced from the card; and means for stopping the movement of the carrying means within a distance shorter than the distance travelled by the carrying means in changing from the stop condition to the uniform velocity condition.

BRIEF DESCRIPTION OF THE DRAWINGS

The foregoing aspects and other features of the present invention will be explained in the following description taken in connection with the accompanying drawings wherein.

DETAILED DESCRIPTION OF THE PREFERRED EMBODIMENTS

Hereinafter, embodiments of the present invention will be described with reference to the drawings.

Figure 1:
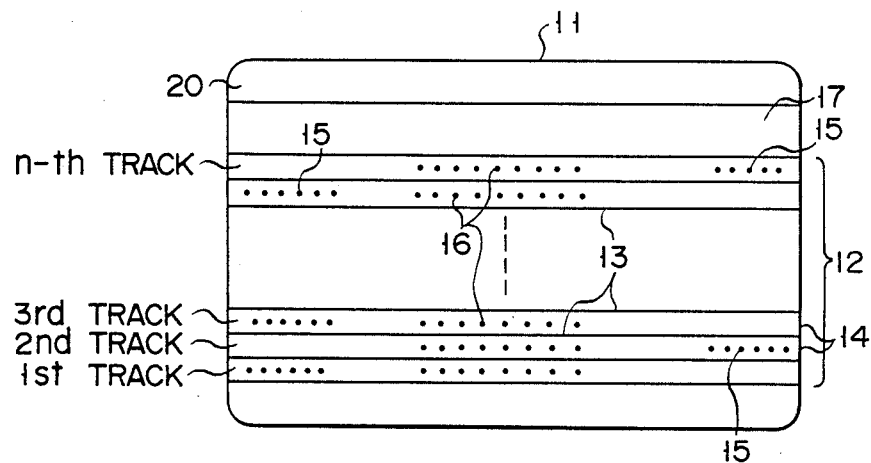
FIG. 1 is a plan view of an optical card embodying the present invention.

Referring to FIG. 1, an optical card 11 according to a first embodiment of the present invention is rectangular and comprises a base member 20 and a recording section (data recording area) 12 disposed on the base member. A plurality of guide lines 13 are provided parallel to the long side of card 11 in the recording area. Two adjacent guide lines 13 define a track 14 therebetween, on which data 16 is recorded for reproduction. Reference numeral 17 denotes a design area in which the name of a publisher of the card, a drawing or pattern according to the utility purpose of the card, and so on, are drawn.

Tracks 14 are named as a first track, a second track, ..., an n-th track from one side to the other side of the card, as shown. The number of tracks 14 may be as large as 2,000.

At one end (the left-hand end in FIG. 1) of each of the odd tracks (the first, the third, the fifth track, address data 15 is previously recorded, whereas address data 15 is recorded at the other end (the right-hand end) of each of the even tracks (the second track, the fourth track, the sixth track,...). Namely, address data 15 is alternately recorded at the right-hand end and the left-hand end of successive tracks 14 of card 11, as shown.

Figure 2:
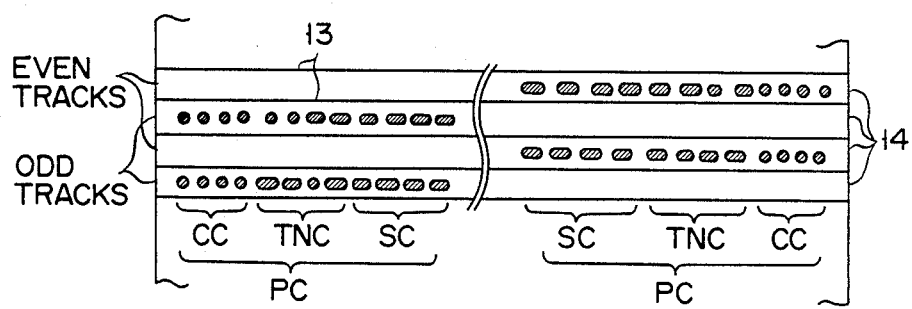
FIG. 2 shows preformat data recorded on tracks of the optical card of the present invention.

Address data 15 includes a preformat data code PC, as shown in FIG. 2. For example, as shown in FIG. 2, preformat data code PC is formed of a clock data code CC used for establishing synchronization during a recording or reproducing operation, a track number code TNC serving as a track-identifying code, and a start code SC representing a start position of an unrecorded area (start position for writing data).

Figure 4:
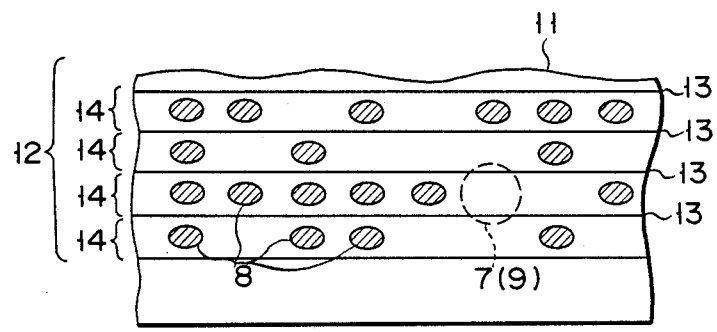
FIG. 4 is an enlarged view of a portion of the optical card of the present invention on which data is recorded.

A code arrangement in preformat data code PC for the odd tracks may be such that clock data code CC, track-number code TNC and start code SC are arranged in this sequence from the left-hand end, as shown. On the other hand, for the even tracks, clock data code CC, track-number code TNC and start code SC may be arranged in this sequence from the right-hand end, as shown. The data recording is performed, as shown in FIG. 4, by irradiating track 14 with a recording laser spot 7 from an optical system described later to form pits 8 in an area succeeding address data 15. On the other hand, the data reproduction is performed by scanning track 14 having pits 8 formed with a reproducing laser spot 9 from the optical system.

Figure 3:
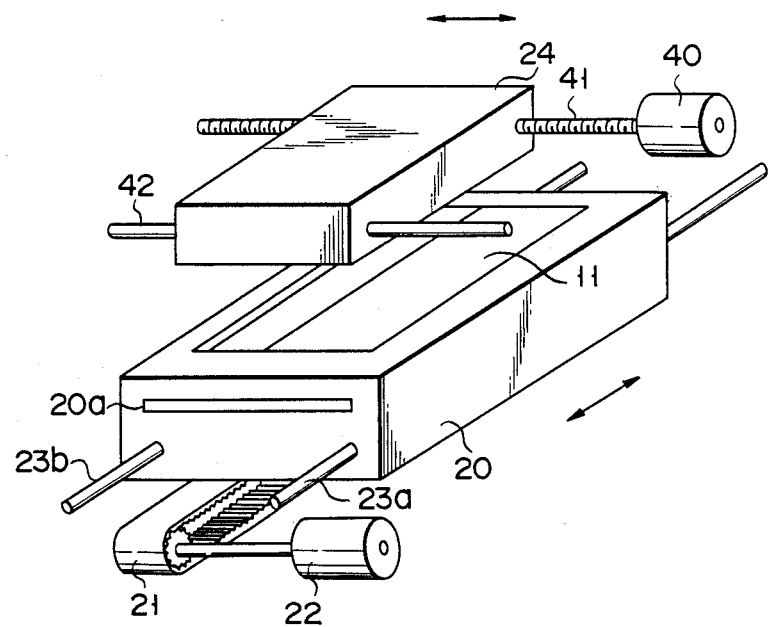
FIG. 3 schematically shows a perspective view of an recording/reproducing apparatus for the optical card of the present invention.

FIG. 3 shows a recording/reproducing apparatus used for recording data on or reproducing data from optical card 11 constructed as above, which includes an optical system 24 and a card carrying system 20. Carrying system 20 is arranged to move optical card 11 backwards and forwards in the direction of the long side thereof while holding it. Carrying system 20 is also called a shuttle. Carrying system 20 has a card slot 20a. A card inserted into slot 20a is held by carrying system 20. A timing belt 21 is attached to the underside of carrying system 20, which is driven by a driving motor 22. When timing belt 21 is driven, carrying system 20 also travels along sliding axles 23a and 23b, causing optical card 11 held by carrying system 20 to travel uniformly (at a constant velocity) in the direction of the long side of the card. Optical system 24 is provided over carrying system 20, which irradiates data recording area 12 of optical card 11 with recording laser spot 7 or reproducing laser spot 9, as shown in FIG. 4.

Optical system 24 is arranged to travel back and forth in the direction of the short side of the card (normal to the direction of travel of carrying system 20) along a sliding axle 42 by rotation of an axle 41 driven by a motor 40.

That is, optical card 1 is moved back and forth by driving motor 22 at a constant velocity in the direction of the long side of the card, while optical system 24 is moved back and forth by driving motor 40 in the direction of the short side of the card. The movement of optical card 1 and optical system 24 permits access to a desired location in a destination track for recording or reproducing data. By irradiating track 14 with laser-beam spot 7 or 9 from optical system 24, the recording or reproducing of data will be performed over a wide area of data recording area 12 of card 11. In this case, it will be apparent that, since data is recorded or reproduced in the direction of the long side of optical card 11, the reciprocating motion of carrying system 20 becomes frequent.

Figure 5:
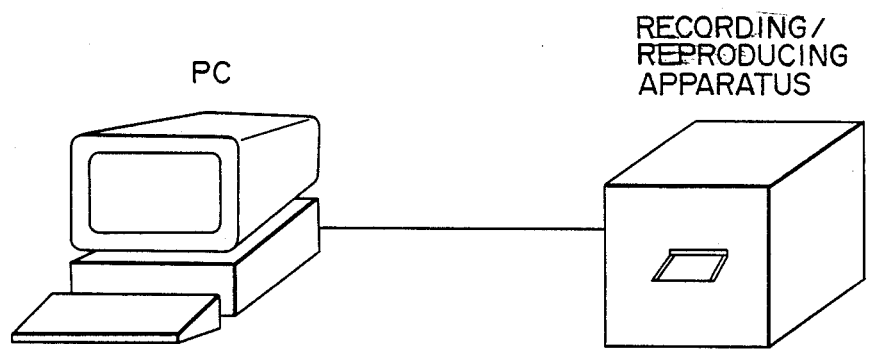
FIG. 5 is a perspective view illustrating connection of the recording/reproducing apparatus for the optical card of the present invention to a personal computer.
Figure 6:
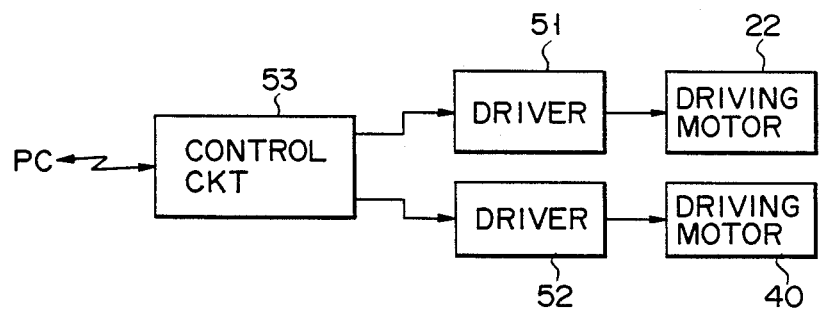
FIG. 6 is a block diagram of the essential electric circuitry components of the recording/reproducing apparatus for the optical card of the invention.

By way of example, the recording/reproducing apparatus as described above is used by connection to a personal computer (hereinafter abbreviated to PC) as shown in FIG. 5. That is, an instruction concerning data recording or reproducing is sent from the PC to a control circuit 53 of the recording/reproducing apparatus, as shown in FIG. 6. Drivers 51 and 52 drive motors 22 and 40, respectively, in response to the respective control signals from control circuit 53. As a result, each of optical system 24 and carrying system 20 shown in FIG. 3 travels a predetermined distance.

Figure 7:
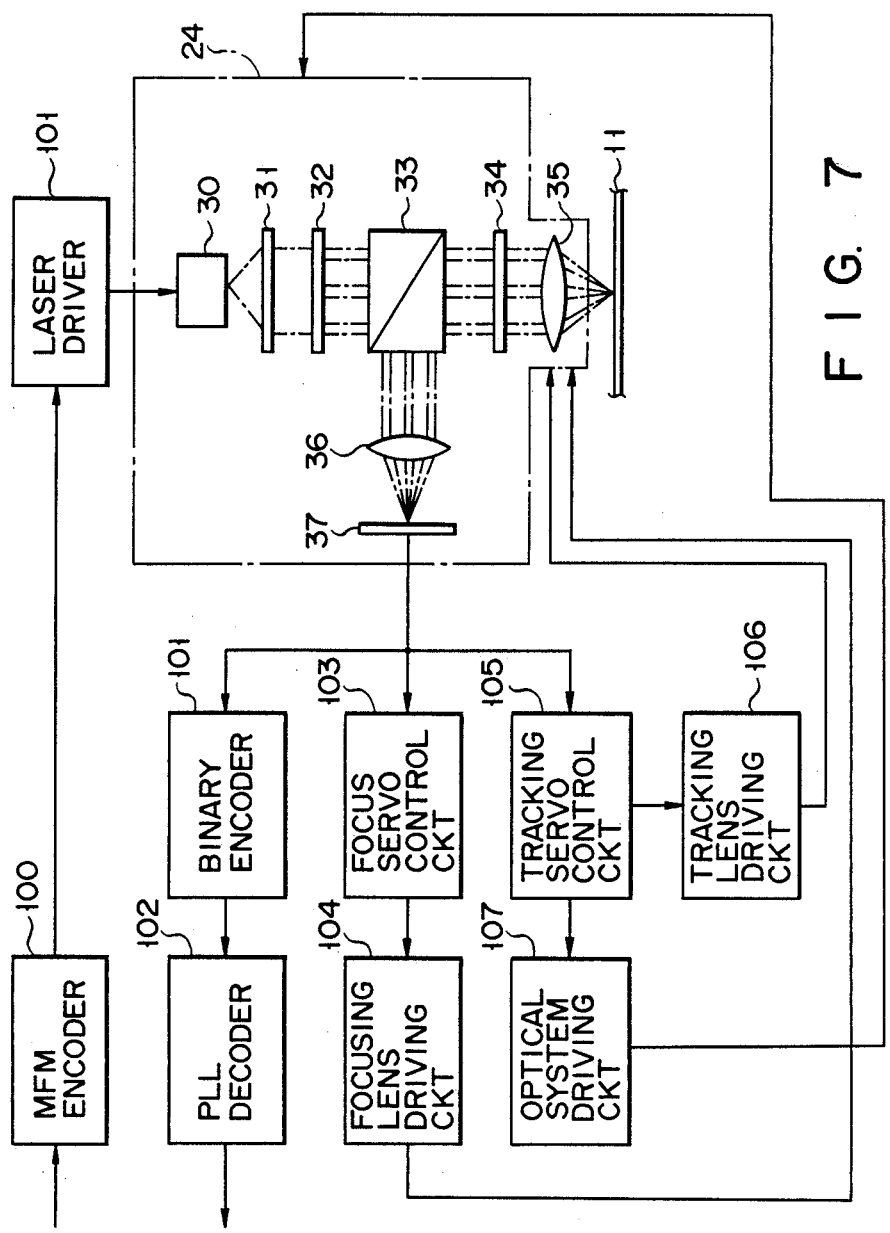
FIG. 7 is a block diagram of a signal processing circuit used in the recording/reproducing apparatus for the optical, card of the present invention.

FIG. 7 is a schematic block diagram of a signal processing section of the data recording/reproducing apparatus. Hereinafter, the operation of the signal processing section of FIG. 7 will be described in accordance with the flow of data.

During a recording operation, write data from the PC is encoded by an MFM encoder 100 and then applied to a laser driver 101. Laser driver 101 drives a semiconductor laser 30 in accordance with the modulated write data. Consequently, a laser beam is emitted from semiconductor laser 30. The laser beam is focused by a correcting lens 31 called a collimating lens into a parallel beam and then directed onto a grating assembly (diffraction grating) 32. By grating assembly 32 the parallel beam is split into three beams comprised of a zero-order beam P0, a +1st-order beam P+1 and a −1st-order beam P-1. These three beams are directed to an objective lens 35 via a beam splitter 33 and a $\lambda/4$ wave-length plate 34. Objective lens 35 focuses the three beams on optical card 11 to form pits, thereby achieving the data recording.

In a reproducing operation, the semiconductor laser is driven by a reproducing instruction from the PC to emit a laser beam. The laser beam is split into three beams which are focused on a predetermined position of optical card 11 by objective lens 35. The three beams reflected from optical card 11 are directed to beam splitter 33 via λ/4 wavelength plate 34. Subsequently, the three beams are reflected on a focusing lens 36 by beam splitter 33 to be focused on an optoelectric device 37 for conversion to an electric signal. The electric signal from optoelectric device 37 is converted to a binary signal by a binary encoder 101 and then applied to a PLL/decoder circuit 102 adapted for clock extraction and decoding. The decoded signal is applied to the PC as readout data.

To perform the recording or reproducing precisely, the data recording/reproducing apparatus has several control systems. For example, the electric signal from optoelectric device 37 is applied to a focusing servo control circuit 103 and a tracking servo control circuit 105. Focusing servo control circuit 103 applies a control signal to an objective lens driving circuit 104 so as to move objective lens 35 in the direction of the optical axis thereof for correcting the focusing error. Tracking servo control circuit 105 feeds a control signal to an objective lens driving circuit 106 so as to move objective lens 35 along the surface of card 11 for correcting the tracking error. Further, tracking servo control circuit 105 applies a control signal to an optical-system driving circuit 107 to move optical system 24 such that the amount of the movement of objective lens 35 can be decreased. Further, tracking servo control circuit 105 receives a signal relating to the amount of the movement of the laser beam from control circuit 53 (FIG. 6) and moves the laser beam among tracks to access a destination track.

Figure 8:
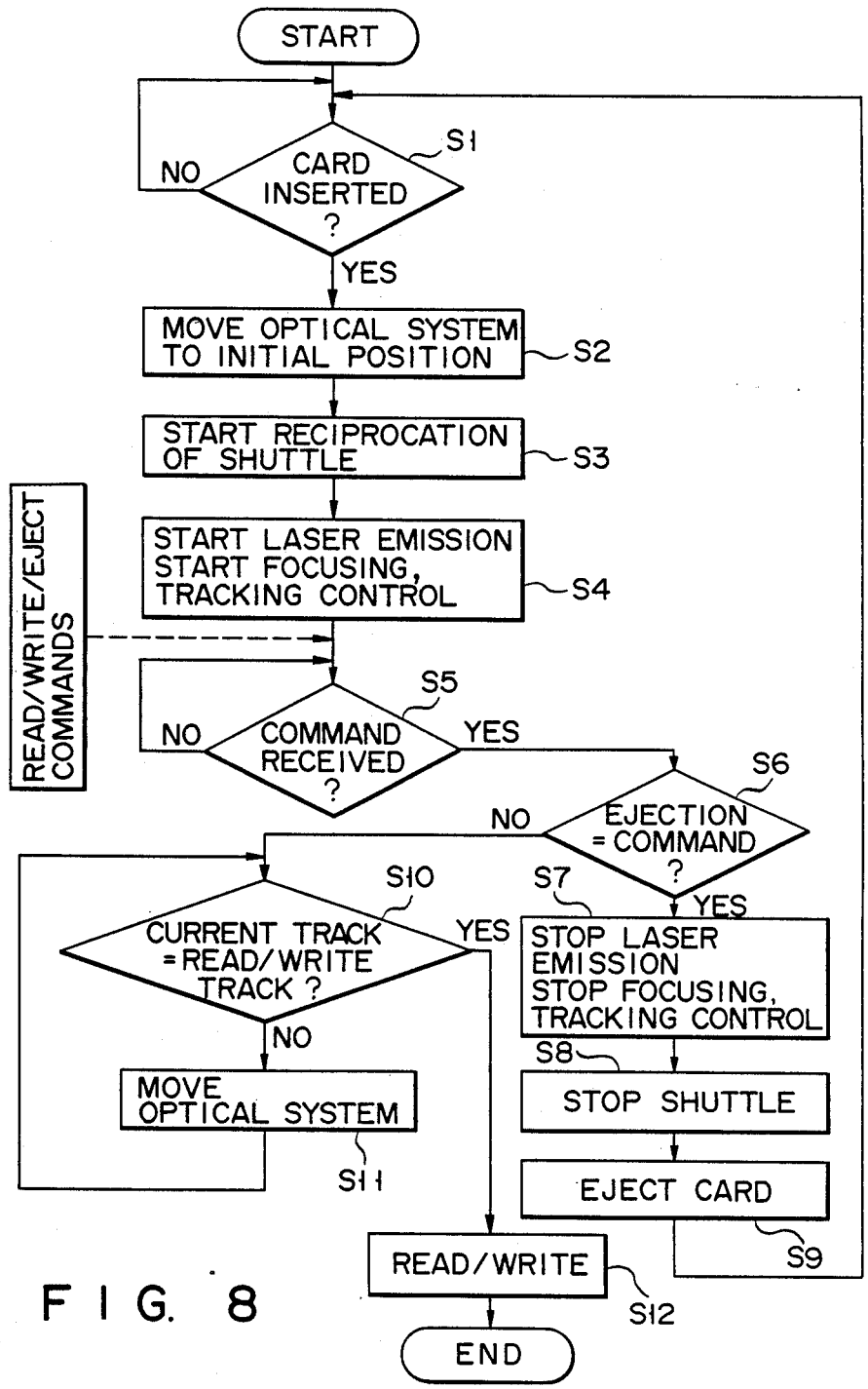
FIG. 8 is a flowchart representing a process of recording data on or reproducing data from the optical card by the use of the recording/reproducing apparatus.

FIG. 8 is a flowchart for the process of recording data on or reproducing data from optical card 11 by using the data recording/reproducing apparatus. First, card 11 is inserted into card slot 20a (FIG. 3) of the apparatus, and the insertion of card 11 is detected by a detector (not shown) in step 1. When card 11 is detected, optical system 39 moves to the initial position in step 2. Further, the reciprocating motion of carrying system (shuttle) 20 is started in step 3. Subsequently, semiconductor laser driving circuit 101 and driving circuits 104 and 106 begin to operate, so that the laser emission and the focusing and tracking control are initiated in step 4. Thereafter, a decision is made by control circuit 53 as to whether a command has been received from the PC (step 5). An instruction issued from the PC comprises a read command for reproducing data, a write command for recording data, and an ejecting command for ejecting card 1. When the reception of a command is confirmed, a decision is made as to whether or not the command is the ejecting command (step 6). When the command is the ejecting command, semiconductor laser driving circuit 101, focusing and tracking driving circuits 104, 106 and optical system driving circuit 107 are all disabled in step 7. Subsequently, the movement of shuttle 20 is stopped in step 8, and card 1 is ejected from card slot 20a in step 9.

When the command is not the ejecting command, a decision is made as to whether or not the current track over which optical system 24 is placed is a destination read/write track (step 10). Where optical system 24 has not yet made an access to the destination read/write track, optical system 24 is further moved in step 11, and the decision is made again as to whether or not optical system 24 has made an access to the destination track in step 10. If optical system 24 is placed just over the destination track, then card carrying system (shuttle) 20 is moved to carry out the data read/write in step 12. After the data read/write is completed, a decision is made as to whether the next command is received from the PC or not. Thereafter, the same steps as above are repeated.

Figure 9:
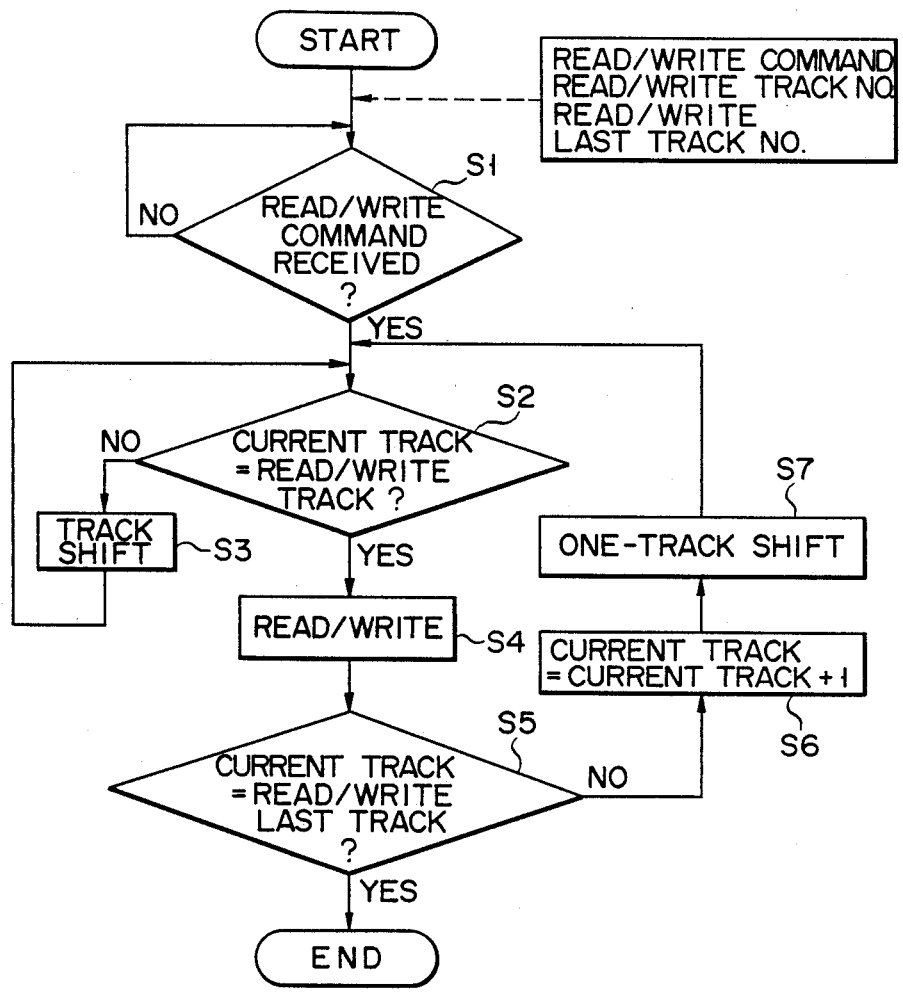
FIG. 9 is a flow chart representing a procedure for successively recording data on or reproducing data from adjacent tracks of the optical card.

FIG. 9 is a flowchart illustrating a procedure of successively writing into or reading from two adjacent tracks. The PC transmits a read/write command, a read/write track number, a read/write last track number and so on to control circuit 53 (refer to FIG. 6). First, control circuit 53 decides whether the read/write command is received or not (step 1). If the command is not yet received, the control circuit stands by. When the command is received, a decision is made as to whether the current track corresponds to the read/write track (step 2). If the answer is NO in step 2, then optical system 24 is shifted by a predetermined number of tracks in step 3. Again, a decision is made as to whether the present track corresponds to the read/write track (step 2). If the answer is YES in step 2, then an operation to write into or read from the track is performed immediately in step 4. After the read/write operation for the track is completed, control circuit 53 decides whether the present track is the read/write last track or not (step 5). When the track is regarded as the last track, the control circuit brings the read/write operation to an end. On the other hand, when the track is not the last track, the present read/write track number is incremented by one in step 6, and optical system 24 is shifted by one track in step 7. Thereafter, a decision is made again in step 2 as to whether the present track corresponds to a read/write track. Subsequently, the above steps are repeated.

Figure 10:
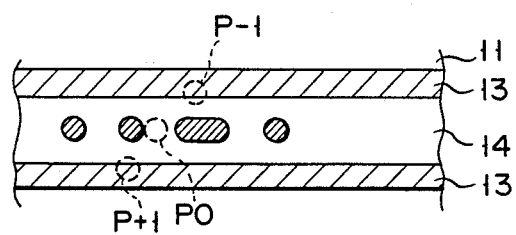
FIG. 10 illustrates conditions in which the optical disk is irradiated with a laser beam.

As described above, during recording or reproducing, optical system 24 is moved in the direction of the short side of the card to make access to a destination track. In this case, as shown in FIG. 10, the ±1st order beams P+1, P−1 among the three beams directed onto optical card 11 are directed onto guide lines 13 located on the opposite sides of recording track 14. Subsequently, carrying system 20 is moved in the direction of the long side of card 11 so that data is recorded or reproduced by means of the center zero-order beam P0.

To record data on optical card 11, it is necessary, prior to recording, to confirm whether or not the beam is on a recording track on which data is to be recorded and to know the start position for recording. This is accomplished as follows.

First, control circuit 53 reads clock data code CC (FIG. 2) from optical card 11 by means of optical system 24 for synchronizing a recording operation, and then reads track number code TNC to confirm that the track is a track for recording. Immediately after start code SC is read, coded data is recorded on the recording track.

As with the recording operation, to reproduce data from optical card 11, control circuit 53 controls optical system 24 to make access to a destination track. The ±1st order beams P+1, P−1 are directed onto guide lines 13 on the opposite sides of a reproducing track 14 from which data is to be reproduced. Next, optical system 24 is moved to make access to a desired location and receive a reflected beam of the zero-order beam P0 from the accessed location by optoelectric device 37. The received data is decoded by decoder circuit 102. In this case, as in the case of the recording operation, track number code TNC and start code SC are successively read out after the decoding is synchronized by clock data code CC.

Figure 11:
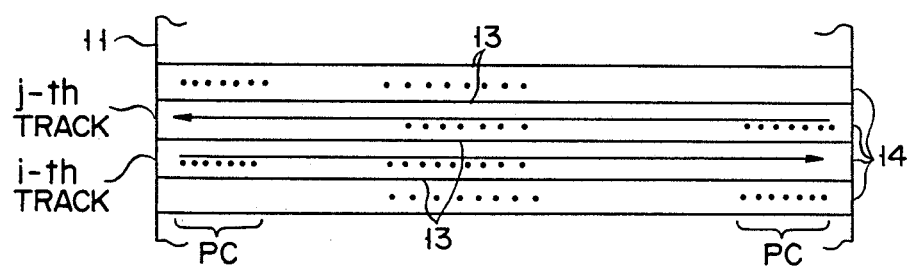
FIG. 11 is a diagram useful for explaining a recording/reproducing operation for the optical card of the present invention.

Next, the case where the j-th track (an even track) is to be written or read immediately after the i-th track (an odd track) is written or read will be described with reference to FIGS. 10 and 11. First, optical system 24 (see FIG. 3) is moved so that the +1st order beam P+1 and the −1st order beam P−1 may locate on guide lines 13 on the opposite sides of a desired track. Next, carrying system 20 (see FIG. 3) starts movement. When the beams move relative to optical card 11 along guide lines 13 thereof in the right-hand direction (see FIG. 11), the recorded preformat data code PC is read from the left-hand side of card 11 by means of the zero-order beam P0. Clock data code CC is read first for synchronization, and then track number code TNC is read to confirm that the beam is on the i-th track, which is the first track for data recording or reproducing. Subsequently, start code SC is read. Immediately after the start code SC is recognized, the data recording or reproducing is started.

After the recording operation for the i-th track is completed, optical system 24 is shifted to the j-th track so as to perform the next recording or reproducing operation. Subsequently, the direction of movement of carrying system 20 is reversed to move the beams in the left-hand direction along guide lines 13 of optical card 11. At this time, the preformat data code PC is read from the right-hand side of card 11 by means of the zero-order beam P0. In this case, as in the recording or reproducing operation for the i-th track, the clock data code CC is used for synchronization. The track number code TNC is used for confirming the j-th track. Subsequently, immediately after the following start code SC is recognized, the recording or reproducing operation is started again. The recording or reproducing operation for the j-th track is performed by using the reverse movement of carrying system 20.

In the case where, immediately after the recording or reproducing operation for an even track, an odd track adjacent to the even track is to be recorded or reproduced, the recording on or reproducing from the odd track can be performed by the reverse movement of carrying system 20.

Further, the case where an even track is recorded or reproduced after the recording or reproducing operation for an odd track which is not adjacent to the even track and vice versa will be considered. In this case also, although optical system 24 must be shifted by two or more tracks to make access to a destination track, it is possible to record on or reproduce from one track during one-way movement of the carrying system and record on or reproduce from the other track during movement of the carrying system in the opposite direction. Therefore, two tracks of an odd and an even track can be recorded or reproduced at each reciprocation of the carrying system, thereby shortening the recording or reproducing time. Moreover, because the preformat data is recorded only at one end of a track, the data storage capacity of card 11 can be increased.

In the above embodiment, a certain number of, e.g. four, preformat data codes PC may be successively recorded at one end of each track. In this case, optical system 24 reads all of the four preformat data codes PC during a recording or reproducing operation, and the recording or reproducing operation can be performed only when two or more PCs are read correctly. Furthermore, in the case where the readout of the first preformat data PC starts with an intermediate portion thereof, the second preformat data code PC can be read even if the first PC cannot be read. In addition, where the PCs of a track cannot be read, optical system 24 may jump to a preceding or following adjacent track to read another preformat data code PC of the next track. Alternatively, optical system 24 may be moved to the other end of the track to read the preformat data code PC of the next track when the optical system is reversed in its movement.

In the above embodiment, the preformat data code PC is recorded on the left-hand side of each of the odd tracks, while on the right-hand side of each of the even tracks. Alternatively, the preformat data code PC may be recorded on the right-hand side of each of the odd tracks, while on the left-hand side of each of the even tracks.

The preformat data code is recorded at the left-hand end or right-hand end of a track. Alternatively, the preformat data may be drawn a little nearer to the center from the left-hand end or the right-hand end.

As describe above, according to the present invention, an optical recording medium can be provided which can shorten the recording or reproducing time and increase the data storage capacity.

In the following, a second embodiment of the present invention will be described.

As shown in FIG. 6, motors 22, 40 are driven to rotate by drivers 51, 52, respectively. Drivers 51, 52 are controlled by a control circuit 53. Control circuit 53 carries out various processes in response to signals issued from the PC.

Figure 12:
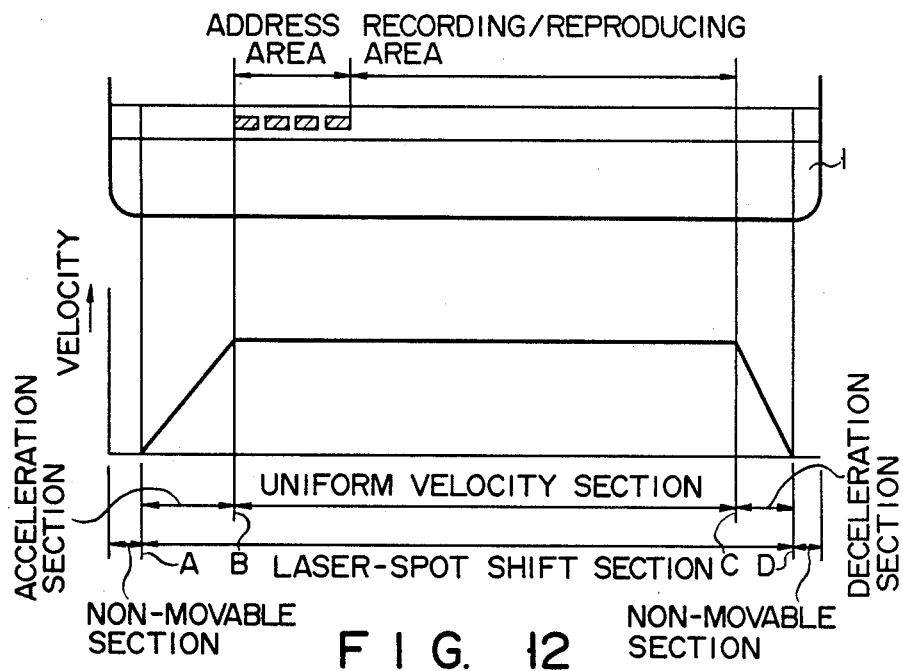
FIG. 12 is a diagram for explaining a variation in the relative travel speed of the optical card and a laser-beam spot.

For recording on or reproducing from a desired track, control circuit 53 starts the acceleration of carrying system 20, or card 11 by supplying a control signal to driver 51, which drives motor 22, first at point A as shown in FIG. 12. The acceleration is continued until a uniform velocity is reached at point B. Thereafter, the readout of address data, the recording or reproducing process and so on are performed at the constant velocity of carrying system 20. When the recording or reproducing area comes to an end at point C, the deceleration of carrying system 20 starts. The carrying system stops at point D. In this case, the deceleration of the carrying system in the deceleration section (from point C to point D) is larger than the acceleration in the acceleration section (from point A to point B), and the deceleration section is shorter in length than the acceleration section. As a result, the uniform velocity section can be lengthened correspondingly. Thus, the data recording/reproducing area of card 10 can be increased.

For example, in FIG. 12, the area including the uniform-velocity section and the acceleration and deceleration sections is 81mm in length, with the acceleration and deceleration sections being 10mm and 7mm, respectively. Therefore, additional data can be written in a space of 3mm. Since the space between bits is 8 microns, 375 data bits can be written into the 3-mm section.

The great deceleration of carrying system 20 due to the shorter deceleration section may be considered to increase oscillation of the carrying system and lower the recording/reproducing capability or the track-scanning capability. However, since the recording/reproducing has been completed at the beginning of the deceleration section, the problem with the recording/reproducing capability can be disregarded. The track-scanning capability can be maintained as far as the deceleration section exists. Further, since the acceleration section is longer than the deceleration section, the acceleration capabilities in the next return movement of carrying system 20 may be restored. Thus, the next recording/reproducing operation will be not affected.

Next, a transition of the velocity of movement of carrying system 20 during a recording/reproducing operation will be described with reference to FIGS. 3 and 6. First, control circuit 53 drives motor 40 through driver 52 to move optical system 24 to a track to be recorded or reproduced. When optical system 20 arrives at the track, control circuit 53 stops the movement of optical system 24 by motor 40 and starts the movement of carrying system 20 by motor 22. At this time, the position of laser beam spot 9 corresponds to point A on the track. The carrying system 20 is accelerated until the laser spot 9 arrives at point B. The movement of carrying system 24 from point B to point C is performed at a uniform velocity. The address data is read out and the confirmation is obtained that optical system 24 is over the track to be recorded or reproduced while carrying system 20 moves at the uniform velocity. Immediately after the address data is read out, the recording/reproducing operation is started. After the recording/reproducing operation, control circuit 53 decelerates carrying system 24 when laser spot 9 arrives at point C. In this case, carrying system 24 is decelerated until laser spot 9 arrives at point D and is stopped at this point. The deceleration in the deceleration section (from point C to point D) is greater than the acceleration in the accelerating section (from point A to point B), and the deceleration section is shorter than the accelerating section.

As described above, to move carrying system 20 carrying the optical card at the uniform velocity, the distance traveled by carrying system 20 to come to a stop from the uniform velocity is made shorter than the distance traveled by carrying system 20 to gain the uniform velocity starting with the stop condition. Namely, the length of the deceleration section can be shorter than that of the acceleration section. As a result, the data area can be increased accordingly without lowering the recording/reproducing capability.

Figure 13:
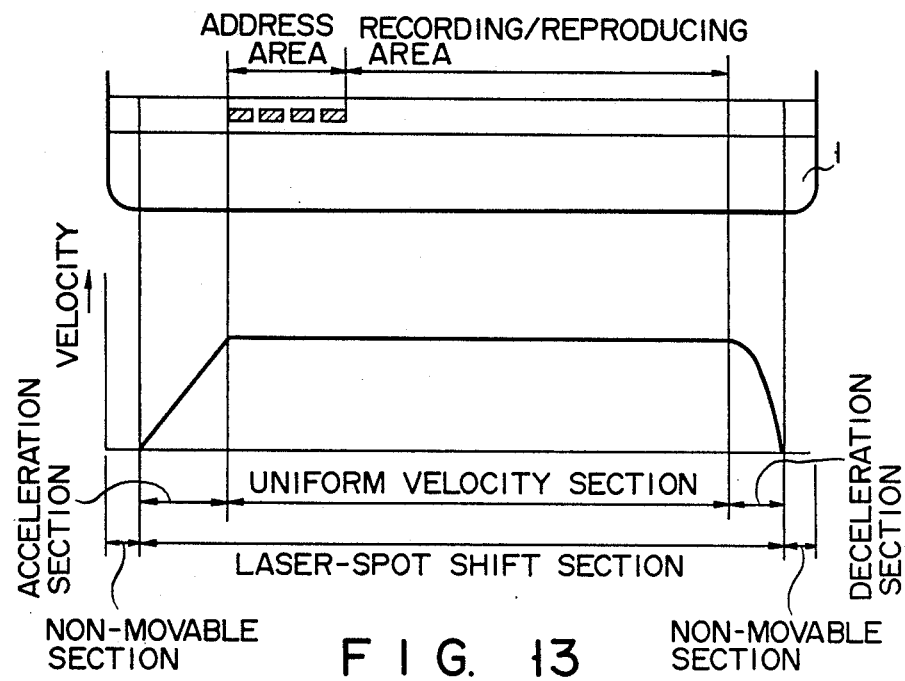
FIG. 13 is a diagram for explaining a variation in the relative travel speed of the optical card and the laser-beam spot in another embodiment of the present invention.

In the above embodiment, in the deceleration section, the deceleration of carrying system 20 is performed at a uniform rate. Alternatively, the rate of change of velocity may be changed at unit-time intervals as shown in FIG. 13. This offers an advantage in that carrying system 20 is more resistant to oscillation.

As described above, according to the present invention, a recording/reproducing apparatus for an optical card can be provided which can increase the storage capacity of the optical card without lowering the recording/reproducing capability. Additional embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An optical card for storing data, comprising:
   a base member;
   a plurality of parallel linear tracks on the base member for storing the data; and
   address means alternately disposed on an opposite end of each successive track for storing an identifying code corresponding to the respective track.

2. The optical card according to claim 1, wherein the address means includes an address area at one end of each track, each area having at least one code stored thereon.

3. The optical card according to claim 2, wherein the base member includes a rectangular card-shaped support, and each address area also includes a clock code for synchronizing the storing of data on the card and a start code for indicating a start position for storing of data on the card.

4. A method of making an optical memory card, comprising the step of:
   dividing at least a portion of an optical recording surface on a card into a plurality of parallel linear tracks; and
   encoding address data corresponding to each track into an address area on an alternating opposite end of each successive track.

5. The method of claim 4, also including the step of recording in each address area a clock code for synchronizing a recording/reproducing operation, and a start code for identifying a start position for recording/reproducing.

6. The method of claim 4, wherein the step of dividing includes the step of defining odd and even parallel tracks along the longitudinal direction of the card, and the step of encoding includes the step of recording the address data into an address area on one end of the even tracks, and the other end of the odd tracks.

7. A data recording/reproducing apparatus for an optical card having a plurality of recording tracks provided in a predetermined direction, on and from which data respectively recorded and reproduced, comprising:
   carrying means for carrying said card;
   recording/reproducing means for recording the data on or reproducing the data from said card carried by said carrying means;
   first driving means for moving said recording/reproducing means relative to said card in a direction perpendicular to the predetermined direction for aligning the recording/reproducing means with one of said plurality of recording tracks; and
   second driving means for accelerating said carrying means in the predetermined direction from a stop condition where the carrying means is stationary to a uniform velocity condition during a predetermined acceleration period and for decelerating and stopping the carrying means during a shorter period than the acceleration period so that the distance decelerated by the carrying means is shorter than that accelerated by the carrying means.

8. The recording/reproducing apparatus according to claim 7, wherein
   said second driving means includes means for maintaining the carrying means at a uniform acceleration between the uniform velocity condition and the stop condition.

9. The recording/reproducing apparatus according to claim 7, wherein said second driving means includes means for changing the speed of the carrying means at a varying acceleration between the uniform condition and the stop condition.

10. The recording/reproducing apparatus according claim 7, wherein said optical card comprises a base member, the recording tracks including a plurality of linear recording tracks provided on the optical card and each having first and second ends, and address means provided alternately on the first and second ends of the successive tracks, for storing identifying codes corresponding to the respective tracks thereon.

11. The recording/reproducing apparatus according to claim 10, wherein the address means includes an address area at one of the first and second ends of each of the tracks, the address area having at least one code stored thereon.

12. The recording/reproducing apparatus according to claim 11, wherein said base member includes a rectangular card-shaped support, and the address area also includes a clock code for synchronizing the storing of data on the card and a start code for indicating the start position for storing data on the card.

* * * * *